Figures 1, 2:
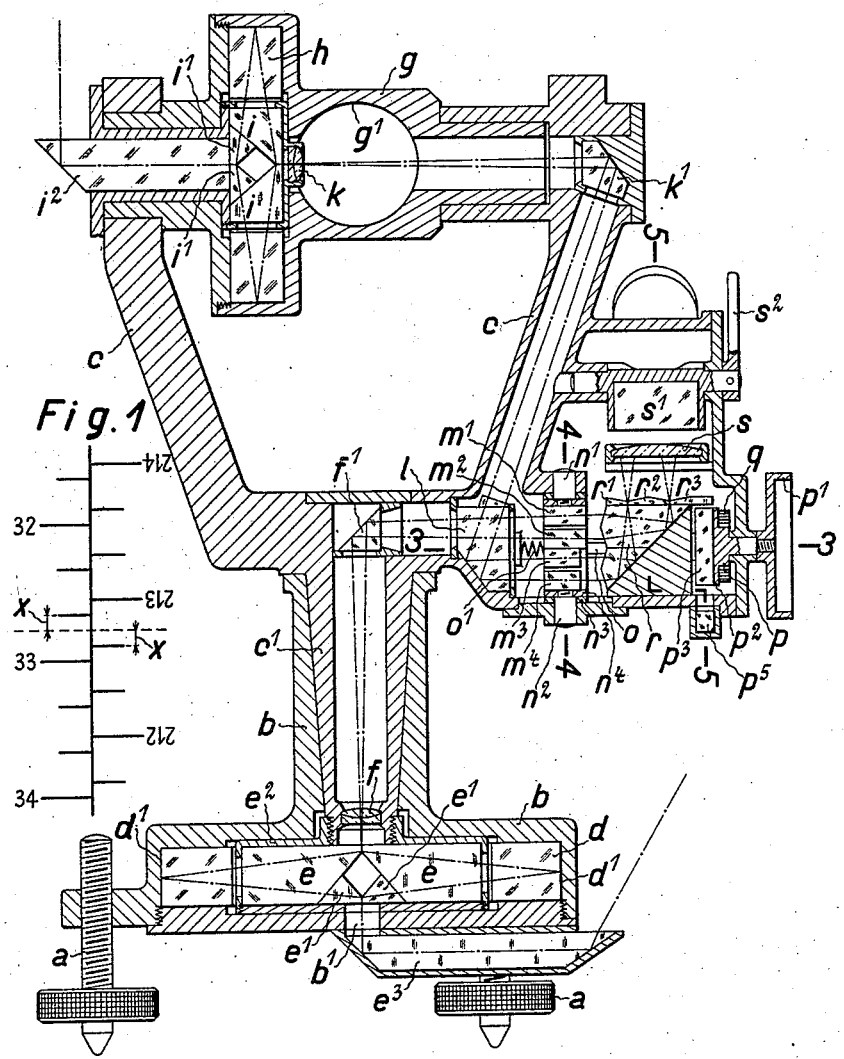

Sept. 16, 1924.  H. WILD  1,508,585
THEODOLITE
Filed May 13, 1921    2 Sheets-Sheet 1

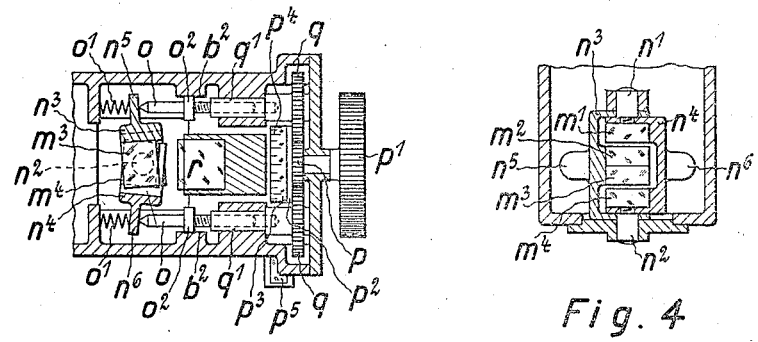
Fig. 3
Fig. 4
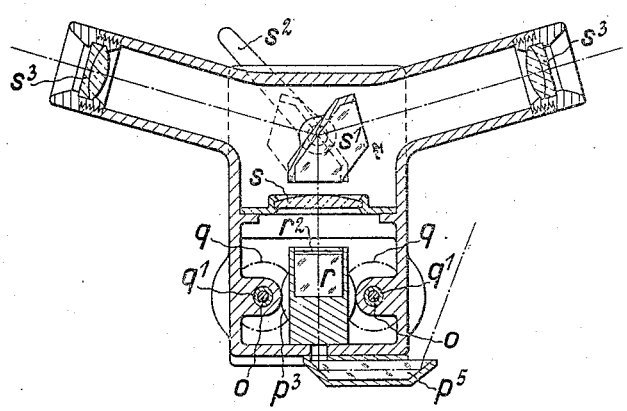
Fig. 5
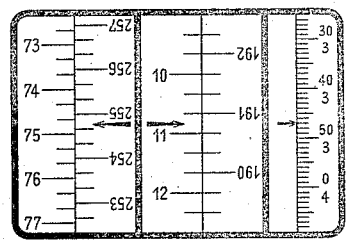
Fig. 6

Patented Sept. 16, 1924.

1,508,585

UNITED STATES PATENT OFFICE.

HEINRICH WILD, OF HEERBRUGG, SWITZERLAND.

THEODOLITE.

Application filed May 13, 1921. Serial No. 469,195.

*To all whom it may concern:*

Be it known that I, HEINRICH WILD, a citizen of Switzerland, residing at Heerbrugg, Switzerland, have invented a new and useful Theodolite, of which the following is a specification.

This invention relates to certain new and useful improvements in a theodolite and it has for its primary object to provide an improved optic structure in which in the field of view of a reading microscope two opposite places of a divided circle are simultaneously so imaged that the two scale-images run parallel to each other and touch each other along a boundary line.

The invention also resides in an improved mounting and arrangement of prism systems with means for adjusting certain of them to obtain proper displacement of the images.

A further object is to provide a branched or double disposition of the eye-lens system with an adjustable prism for directing the rays to either branch.

The invention further resides in novel means for mounting and adjusting the plano-parallel prisms or glass plates by which the rays may be brought into proper focus.

Further, the invention resides in the features of construction and the arrangements and combinations of parts hereinafter described and claimed, reference being had to the accompanying drawings wherein:

Figure 1 shows two scale images touching each other and running in the opposite sense;

Figure 2 shows the construction of the complete instrument in a vertical section, the Figs. 3, 4 and 5 illustrate particulars of the instrument in section according to the corresponding lines of intersection of Fig. 2 whilst Fig. 6 reproduces the image presented in the field of view of the reading ocular. The instrument has in a well-known way a lower body $b$, adjustable by three screws $a$, in which there is rotatably supported by means of a conical, hollow pivot $c^1$ an upper body $c$, representing the telescope carrier. The lower body $b$ forms an inclosing prism casing having an upstanding journal to receive the pivot $c^1$ said casing having a compartment into which an annular glass body $d$ is rigidly inserted. The glass ring $d$ is the carrier of the horizontal circle; the division of the circle is etched on the outer, cylindrical surface $d^1$ of the ring and protected by a reflecting coat applied to the said surface $d^1$. Within the hollow space enclosed by the glass ring $d$ there are two reflecting prisms $e$ and two smaller reflecting prisms $e^1$, cemented to the same, which are immovably disposed in a joint casing $e^2$, tightly screwed to the pivot $c^1$. With the aid of a reflecting prism $e^3$, fixed underneath the part $b$, an illuminating ray pencil coming from outside is transmitted through a central aperture $b^1$ to the two prisms $e^1$ and from here each half of the said ray pencil reaches two opposite places of the surface $d^1$, carrying the division of the circle. Owing to the reflecting coat applied to the said surface, the incident rays are reflected in an approximately radial direction and thereby the division of the circle appears dark on a light ground. The inclined surfaces, coinciding in the axis, of the two prisms $e$ reflect the rays, reflected by the two places of the divided circle, with a slight, relative inclination into the hollow space of the pivot $c^1$ where they first penetrate a common lens system $f$, embodying the objective of the reading microscope and are then transmitted in an approximately horizontal direction by a likewise common reflecting prism $f^1$.

The same device as described above for the horizontal circle is also provided correspondingly for the circle of altitude. On the telescope carrier $c$ there is rotatably disposed about an axis perpendicular to that of the pivot $c^1$ a part $g$, to which the telescope is assumed to be adapted. In the drawing this is only shown by a boring $g^1$, provided for in the part $g$. Directly beside the telescope the part $g$ is carried out as a universally closed casing into which again a glass ring $h$, carrying the division of the circle of altitude, is fixed. Within the glass ring $h$ there is a prism system $i$, $i^1$, exactly corresponding to the disposition of prisms of the horizontal circle. The transmission of the illuminating ray pencil is effected by means of a reflecting prism $i^2$, inserted into the hollow journal. The rays emerging from the two illuminated places of the divided circle are again reflected into the hollow, axial space of the part $g$, penetrate a common lens system $k$, representing the microscope objective, and then get down with the aid of a reflecting prism $k^1$ through the hollow arm of the telescope carrier $c$ to a prism system $l$, cemented together of two parts, which retransmits the rays close below the ray pencil systems, emerging from the horizontal circle, approximately parallel to the same. The rays emerging from the horizontal circle thereby pass through the upper, plano-parallel part of the prism system $l$ in a straight direction. The four ray pencil systems, now running parallel to each other in approximately the same direction, penetrate behind the prism system $l$ one each of four closely superposed plano-parallel glass plates $m^1$, $m^2$, $m^3$ and $m^4$, which are so cemented in pairs to two stirrups $n^3$ and $n^4$, rotatable about two vertical pivots $n^1$ and $n^2$, that with an opposite rotation of the two stirrups $n^3$ and $n^4$ about their common journals both the two images of the horizontal circle and those of the circle of altitude suffer a displacement each in opposite directions. The one stirrup $n^3$ carries to this effect the two medium plano-parallel plates $m^2$ and $m^3$, whilst to the second stirrup $n^4$ there are fixed the uppermost and the lowermost plate $m^1$ and $m^4$. Thereby, the thickness of the plano-parallel plates measured in the direction of the rays is adapted to the amount of the displacement of the image, desired in each particular case. The required opposite but equally large rotation of the two stirrups $n^3$ and $n^4$ is effected by two displaceable pins $o$ which press against corresponding extensions $n^5$ and $n^6$ of the stirrups. By means of two springs $o^1$, supported by projections of the casing, the extensions $n^5$ and $n^6$ are permanently brought into contact with the pins $o$. The uniform displacement of the two pins $o$ is initiated by a toothed wheel $p$, rigidly connected to a roughened disc $p^1$, which wheel simultaneously engages in two toothed wheels $q$, equiaxially supported with the pins $o$, thereby coupling both to an equally large rotation in the same direction. Each of the two toothed wheels $q$ forms one piece with a bush $q^1$ with the aid of which it is supported within the casing and which is provided with a female thread in which engages the rear part of the pin $o$. By means of a collar $o^2$, fixed to the pin $o$ which collar is flattened on one side and slides therewith along a guide surface $b^2$ of the casing, the pin $o$ is secured against rotation so that by rotating the roughened disc $p^1$ the plano-parallel plates $m^1$, $m^2$, $m^3$ and $m^4$ receive in pairs the desired symmetrical rotating motion. Behind the system of the plano-parallel plates all four ray pencil systems are deflected upwards by about 90° with the aid of a prism system $r$ composed of two parts and thus transmitted into the reading ocular. On the entrance side of the rays the said prism system $r$ is provided for both the pair of images of the horizontal circle and that of the circle of altitude with two ridge surfaces each, the object of the latter being to bring the two scale-images of each pair so close together that they touch each other in the proper way. With a view to compensate again the deflexion of the single ray pencil systems, glass wedges $r^1$, $r^2$ and $r^3$ with the corresponding oppositely inclined ridge surfaces are cemented on the exit side of the rays of the prism system $r$. Thereby, the parallel displacement effected by the two ridge surfaces for each ray pencil system, in conjunction with the slight relative inclination of both ray pencil systems caused by the two reflecting prisms $e$ is so adjusted for each pair of images, that the exit pupils cover each other as completely as possible. The rays emerging from the prism system $r$ enter the ocular system, consisting of a fixed lens $s$, a reflecting prism $s^1$, adjustable from outside with the aid of a lever $s^2$ and two uniform, fixed eye-lens systems $s^3$ (vide Fig. 5). The double disposition of the eye-lens system $s^3$ in conjunction with the adjustable prism $s^1$ purposes to permit of also reading with the telescope completely turned over without changing the position. In order to be able to read off the amount of the displacement of the image caused by the plano-parallel plates $m^1$, $m^2$, $m^3$ and $m^4$, the actuating toothed wheel $p$ is rigidly connected to a plate $p^2$, on which a round glass disc $p^3$ is cemented equiaxially with the toothed wheel $p$. The glass disc $p^3$ carries on its cylindrical circumference a graduation $p^4$ which permits of directly reading the subunits of the division of the circle. An appertaining pointer is disposed on the plano-parallel part of the glass-wedge disc $r^3$, projecting beyond the glass disc $p^3$. The illumination required for the reading of the graduation $p^4$ on the disc $p^3$ takes place by means of a reflecting prism $p^5$, fixed underneath the disc $p^3$, which prism transmits a lateral ray pencil from below through the glass disc $p^3$.

Fig. 6 shows the image presented to the observer in the ocular field. In the left part of the field there appears the pair of images of the circle of altitude, in the middle one that of the horizontal circle, whilst on the right side both reading line and scale for the displacements of the image are to be seen. The two divisions of the circle are divided into thirds of a degree. As with each reading the medium is formed by two single values, of the values of division, lying between the corresponding whole numbers of degrees, being 180° apart, one half is to be taken in each case i. e. when counting the whole angle existing between the two corresponding numbers of degrees each value of division corresponds to an angle of 10'. The scale for the displacement of the image accordingly comprises the range of 10 minutes and permits of directly reading minutes and seconds. About in the centre of each pair of images of the divisions of the circle there is a pointing mark, indicating the place at which the angular difference of both divisions exactly amounts to 180°. With the position of the scales chosen in Fig. 6 it is assumed that a measurement with the horizontal circle has taken place; the two scale-images of the horizontal circle are so adjusted by rotating the roughened disc $p^1$, that the divisions are exactly facing each other. The reading of the chief division shows the angular value up to 10 minutes, with the numbers marked in the figure the value 10° 50′. The appertaining fraction is readily indicated by the scale of displacement, in the case illustrated the value 3′ 47″, so that a total reading of 10° 53′ 47″ is to be recorded.

I claim:

1. In a theodolite, a divided circle, a reading microscope, optical means for simultaneously imaging two opposite points of the divided circle in the field of said microscope, relatively movable pairs of plano-parallel glass plates, each pair inserted in the path of rays from a respective one of the two images, and means for adjusting the pairs simultaneously in opposite directions.

2. In a theodolite, a divided circle, a reading microscope, optical means for simultaneously imaging two opposite points of the divided circle in the field of said microscope, relatively movable pairs of plano-parallel glass plates, each pair inserted in the path of rays from a respective one of the two images, resilient means for urging the pairs to their normal position, and means adjusting the pairs in opposite directions against the tension of said resilient means.

3. In a theodolite, a divided circle, a reading microscope, optical means for simultaneously imaging two opposite points of the divided circle in the field of said microscope, relatively movable pairs of plano-parallel glass plates, each pair inserted in the path of rays from a respective one of the two images, means for adjusting the pairs on an axis at right angles to the pencil rays of the images, said microscope having branched reading tubes, and means for selectively reflecting the reading to either tube.

4. In a theodolite, a divided circle, a reading microscope, optical means for simultaneously imaging two opposite points of the divided circle in the field of said microscope, relatively movable pairs of plano-parallel glass plates, each pair inserted in the path of rays from a respective one of the two images, means for adjusting the pairs on an axis at right angles to the pencil rays of the images, said microscope having spaced reading lenses, and an adjustable reflecting prism movable to permit reading from either lens.

5. A casing having an upstanding journal bearing, a telescope-carrying frame having a hollow pivot journaled in said bearing, a divided circle fixed in the casing, a tubular casing transversely arranged on the lower end of the pivot and within the first casing and securing the pivot in position, reflecting prisms in the tubular casing within the plane of the divided circle, a reflecting prism in the upper end of the pivot, a microscope, and displacing means between the last prism and the microscope.

HEINRICH WILD.

Witnesses:
FRITZ LANDER,
RICHARD HAHN.